United States Patent [19]
Baker et al.

[11] Patent Number: 5,307,484
[45] Date of Patent: Apr. 26, 1994

[54] RELATIONAL DATA BASE REPOSITORY SYSTEM FOR MANAGING FUNCTIONAL AND PHYSICAL DATA STRUCTURES OF NODES AND LINKS OF MULTIPLE COMPUTER NETWORKS

[75] Inventors: John D. Baker, Troy; Michael J. Cannon, Sterling Heights; Kenneth E. Demski, Livonia; Norman F. Kent, Highland; David H. Myers, East Detroit, all of Mich.

[73] Assignee: Chrysler Corporation, Highland Park, Mich.

[21] Appl. No.: 665,105

[22] Filed: Mar. 6, 1991

[51] Int. Cl.$^5$ .............................................. G06F 13/00
[52] U.S. Cl. .................................. 395/600; 355/575; 355/325; 364/285; 364/283.4; 364/229.4; 364/DIG. 1

[58] Field of Search ............... 395/575, 800, 650, 325, 395/600; 364/491

[56] References Cited

U.S. PATENT DOCUMENTS

| | | | |
|---|---|---|---|
| 4,224,664 | 9/1980 | Trinchieri | 395/575 |
| 4,922,491 | 5/1990 | Coale | 371/16.5 |
| 5,218,551 | 6/1993 | Agrawal | 364/491 |

Primary Examiner—Thomas C. Lee
Assistant Examiner—Jennifer M. Orzech

[57] ABSTRACT

A relational data base system useful for managing a data communications network from a central repository employs a nonstandard reference key along with primary and foreign keys to research, address, retrieve and manipulate records of functional and physical entities and attributes of nodes and links that form the network.

7 Claims, 14 Drawing Sheets

GFLINE

| I LINE FUNCL | N LINE NTWK |
|---|---|
| 1(PK512) | CL12054 |
| 2(PK514) | CL12053 |

(EXCERPTS FROM FUNC LINE TABLE 210)

502

GPIMPL

| I IMPL PHYS (522) | I SEQ (524) | C STAT | N FUNCL LOGCL TBL | I FUNCL LOGCL KEY | N HDWE HDWE TBL | I HDWE HDWE KEY |
|---|---|---|---|---|---|---|
| 1 | 1 | A | [GFLINE | 1(FK512)]NSR | [GPMODM | 1(FK516)]NSR |
| 1 | 2 | A | [GFLINE | 1(FK512)]NSR | [GPCIRC | 1(FK517)]NSR |
| 1 | 3 | A | [GFLINE | 1(FK512)]NSR | [GPMODM | 2(FK518)]NSR |
| 2 | 1 | A | [GFLINE | 2(FK514)]NSR | [GPCABL | 1(FK520)]NSR |

(EXCERPTS FROM PHYSICAL IMPLEMENTATION TABLE 230)

504

| GPMODM | | GPCIRC | | GPCABL | |
|---|---|---|---|---|---|
| I MODEM PHYS | I HDWE MOD | I CIRC PHYS | I CIRC | I CBL PHYS | I HDWE MOD |
| 1(PK516) | MODEM 1 | 1(PK517) | CIRCUIT 1 | 1(PK520) | CABLE 1 |
| 2(PK518) | MODEM 2 | | | | |

(EXCERPTS FROM MODEM TABLE 250)  (EXCERPTS FROM CIRCUIT TABLE 264)  (EXCERPTS FROM CABLE TABLE 276)

GFTERM

| I<br>TERMNL<br>FUNCL | N<br>TERMNL<br>NTWK |
|---|---|
| 1(PK612) | TM18080 |
| 2(PK614) | TM18082 |
| 3(PK616) | TM18084 |
| 4(PK618) | TM18086 |

(EXCERPTS FROM FUNC TERMINAL TABLE 214)

602

GPIMPL

| I<br>PHYS<br>IMPL | SEQ | C<br>STAT | N<br>FUNCL<br>LOGCL<br>TBL | I<br>FUNCL<br>LOGCL<br>KEY | N<br>HDWE<br>TBL | I<br>HDWE<br>KEY |
|---|---|---|---|---|---|---|
| 010 | 1 | A | [GFTERM | 1(FK612)]NSR | [GPTERM | 3(FK620)]NSR |
| 011 | 1 | A | [GFTERM | 2(FK614)]NSR | [GPTERM | 3(FK620)]NSR |
| 012 | 1 | A | [GFTERM | 3(FK616)]NSR | [GPTERM | 3(FK620)]NSR |
| 013 | 1 | A | [GFTERM | 4(FK618)]NSR | [GPTERM | 4(FK622)]NSR |

(EXCERPTS FROM PHYSICAL IMPLEMENTATION TABLE 230)

604

GPTERM

| I<br>TERMNL<br>PHYS | I<br>HDWE<br>SER |
|---|---|
| 1 | 3279 |
| 2 | 3476 |
| 3(PK620) | 4281 |
| 4(PK622) | 5262 |
| 5 | 2378 |

(EXCERPTS FROM TERMINAL TABLE 282)

GPMODM
_____

| I MODEM PHYS | I HDWE MOD |
|---|---|
| 1 | 456 |
| 2(PK712) | 123 |
| 3 | 821 |
| 4 | 444 |
| 5 | 222 |

(EXCERPTS FROM MODEM TABLE 250)

702

GHDFIN
_____

| I HDWE FIN | N HDWE TBL | I HDWE KEY | I FIN |
|---|---|---|---|
| 1 | [GPMODM | 1]NSR | 1 |
| 2 | [GPCIRC | 1]NSR | 3 |
| 3 | [GPMODM(FK712) | 2](FK712)NSR | 2(FK714) |
| 4 | [GPHOST | 1]NSR | 4 |
| 5 | [GPCCU | 1]NSR | 5 |

(EXCERPTS FROM HARDWARE FINANCIAL TABLE 310)

704

GFIN
_____

| I FIN | A COST |
|---|---|
| 1 | 50 |
| 2(PK714) | 100 |
| 3 | 175 |
| 4 | 25 |
| 5 | 60 |

(EXCERPTS FROM FINANCIAL TABLE 311)

GPTERM

| I<br>TERMNL<br>PHYS | I<br>HDWE<br>MOD |
|---|---|
| 1 | 123 |
| 2 | 256 |
| 3 | 3279(FK808) |
| 4 | 3279(FK808) |
| 5 | 3279(FK808) |

(EXCERPTS FROM TERMINAL 282)

802

GMTERM

| I<br>HDWE<br>MOD | I<br>LOGMODE<br>PREF | Q<br>COLM | Q<br>ROW |
|---|---|---|---|
| 3278M4 | T3278M4 | 80 | 43 |
| 3279M5(PK808) | T3279M5 | 133 | 36 |
| 3278M2 | T3278M2 | 80 | 24 |

(EXCERPTS FROM TERMINAL MODEL 286)

GFLINE

| I<br>LINE<br>FUNCL | N<br>LINE<br>NTWK |
|---|---|
| 1(PK908) | FL14109 |
| 2 | CL12100 |
| 3 | CL12700 |

(EXCERPTS FROM FUNC LINE TABLE 210)

902

GL2CCU

| I<br>LINE<br>CCU<br>CONN | I<br>LINE<br>FUNCL | I<br>CCU<br>FUNCL |
|---|---|---|
| 1 | 1(FK908) | 1(FK910) |
| 2 | 1(FK908) | 2(FK912) |
| 3 | 1(FK908) | 3(FK914) |
| 4 | 1(FK908) | 4(FK915) |
| 5 | 1(FK908) | 5(FK916) |

(EXCERPTS FROM LINE TO CCU TABLE 236)

904

GFCCU

| I<br>CCU<br>FUNCL | N<br>CCU<br>NTWK |
|---|---|
| 1(PK910) | FC141095 |
| 2(PK912) | FD141091 |
| 3(PK914) | FD141092 |
| 4(PK915) | FD141093 |
| 5(PK916) | FD141094 |

(EXCERPTS FROM FUNC CCU TABLE 212)

906

TRANSPARENT TO USER

GFLINE
I
LINE
FUNCL
1(PK908)

GL2CCU
I
LINE
FUNCL
1(PK908)

JOIN A

908

TRANSPARENT TO USER

GL2CCU
I
CCU
FUNCL
1(FK910)
2(FK912)
3(FK914)
4(FK915)
5(FK916)

GFCCU
I
CCU
FUNCL
1(PK910)
2(PK912)
3(PK914)
4(PK915)
5(PK916)

JOIN B

GPT1ND

| T1 NODE PHYS | I T1 NODE |
|---|---|
| 1 | 4 |
| 2(PK1014) | 5 |
| 3 | 6 |
| 4 | 2 |

(EXCERPTS FROM T1 NODE TABLE 220)

1002

GPT1SL

| I T1 SLOT PHYS | I T1 NEST PHYS | I T1 SLOT |
|---|---|---|
| 1 | 1 | 1 |
| 2 | 2 | 1 |
| 3(PK1010) | 2(FK1012) | 2 |
| 4 | 3 | 1 |

(EXCERPTS FROM T1 SLOT TABLE 224)

1006

GPT1NE

| I T1 NEST PHYS | T1 NODE PHYS | I T1 NEST |
|---|---|---|
| 1 | 1 | 1 |
| 2(PK1012) | 2(FK1014) | 1 |
| 3 | 5 | 1 |
| 4 | 4 | 1 |
| 5 | 3 | 1 |

(EXCERPTS FROM T1 NEST TABLE 222)

1004

GPT1CH

| I T1 CHNL PHYS | I T1 SLOT PHYS | I T1 CHNL |
|---|---|---|
| 1 | 1 | 1 |
| 2 | 2 | 1 |
| 3 | 3(FK1010) | 1 |
| 4 | 3(FK1010) | 2 |
| 5 | 4 | 1 |

(EXCERPTS FROM T1 CHANNEL TABLE 226)

GPHOST

| I<br>GPHOST<br>PHYS | I<br>HDWE<br>SER |
|---|---|
| 1 | 4 |
| 2 | 5 |
| 3(PK1102) | 6 |

(EXCERPTS FROM HOST TABLE 291)

1102

GHDLOC

| I<br>HDWE<br>LOC | N<br>HDWE<br>TBL | I<br>HDWE<br>KEY | I<br>LOC |
|---|---|---|---|
| 1 | [GPHOST | 1]NSR | 3 |
| 2 | [GPCIRC | 1]NSR | 1 |
| 3 | [GPHOST | 2]NSR | 1 |
| 4 | [GPHOST(1104) | 3(FK1102)]NSR | 2(FK1106) |

(EXCERPTS FROM HARDWARE LOCATION 302)

1104

GLOCN

| I<br>LOC | I<br>FLR | I<br>BLDG |
|---|---|---|
| 1 | 1ST FLR | 1(FK1108) |
| 2(PK1106) | 2ND FLR | 1(FK1108) |
| 3 | 1ST FLR | 3 |

(EXCERPTS FROM LOCATION TABLE 304)

1106

GBLDG

| I<br>BLDG | N<br>BLDG |
|---|---|
| 1(PK1108) | KELLER |
| 2 | MIS |
| 3 | ENG |

(EXCERPTS FROM BUILDING TABLE 306)

GIMPPL

| I D END | C STAT |
|---|---|
| 90-123 | o |
| 90-123 | o |

(EXCERPTS FROM IMPLEMENTATION PLAN TABLE 404)

1202

GFLINE

| I LINE FUNCL | N LINE NTWK | C STAT |
|---|---|---|
| 821(PK1202) | CL12055 | A |

(EXCERPTS FROM FUNC LINE TABLE 210)

1204

GFCCU

| I CCU FUNC | N CCU NTWK | C STAT |
|---|---|---|
| 123(PK1204) | CW00161 | P |

(EXCERPTS FROM FUNC CCU TABLE 212)

1206

GL2CCU

| I LINE CCU CONN | I CCU FUNCL | I LINE FUNCL | C STAT |
|---|---|---|---|
| 1280(PK1206) | 123(FK1204) | 821(FK1202) | P |

(EXCERPTS FROM LINE TO CCU TABLE 236)

1208

GIMPCH

| I SRVRQ TP | N TBL | I KEY | |
|---|---|---|---|
| 90-123 | [GFCCU | 123] | NSR |
| 90-123 | [GL2CCU | 1280] | NSR |

(EXCERPTS FROM IMPLEMENTATION PLAN CHANGE TABLE 402)

```
SELECT G.GFLINE.N_LINE_NTWK
     , G.GFCCU.N_CCU_NTWK
  FROM G.GFLINE
     , G.GL2CCU
     , G.GFCCU
 WHERE (G.GFLINE.N_LINE_NTWK = 'FL14109')
   AND (G.GL2CCU.I_CCU_FUNCL = G.GFCCU.I_CCU_FUNCL)
   AND (G.GL2CCU.I_LINE_FUNCL = G.GFLINE.I_LINE_FUNCL)
ORDER BY G.GFLINE.N_LINE_NTWK
       , G.GFCCU.N_CCU_NTWK
```

PRESTORED SQL QUERY

FIG. 13.

| N LINE NTWK | N CCU NTWK |
|---|---|
| FL14109 | FC141095 |
| FL14109 | FD141091 |
| FL14109 | FD141092 |
| FL14109 | FD141093 |
| FL14109 | FD141094 |

USER TERMINAL DISPLAY

FIG. 14.

RELATIONAL DATA BASE REPOSITORY SYSTEM FOR MANAGING FUNCTIONAL AND PHYSICAL DATA STRUCTURES OF NODES AND LINKS OF MULTIPLE COMPUTER NETWORKS

BACKGROUND OF THE INVENTION

FIELD OF THE INVENTION

This invention relates generally to voice, video and data network management and in particular, to a network management system employing a relational data base repository.

COMMUNICATION NETWORKS

The present invention focuses on data communication networks ranging from small networks within a single building or campus-like complex to large geographically distributed networks spanning the nation. A network comprises network or nodal switches (nodes) interconnected by transmission links. Wire, cable, radio, satellite or fiber optic units form the links.

Various modes of accessing networks exist. A user may have a hard-wired dedicated port into a switched node. Users may share an access link and wait to transmit when polled; or may dial into a particular access port. Special arrangements exist for users who first must access a private small network and then require connection to a large, geographically distributed network or sets of networks. The small network could be a digital private branch exchange (PBX) with dial-in access or a local area network (LAN) that might operate in a token-passing (polling) mode or a contention (random) mode.

Where interconnected networks incorporate a variety of data sources, the interconnections are done through gateways. These gateways provide the necessary protocol translation and interfacing between disparate networks of possible different bit rates (bandwidth) and packet-handling capabilities, and different architectural constructs. Gateways exist as separate intelligent systems (nodes) or as embedded circuits within network switches.

The network may deliver traffic correctly and to the right place, yet the system may not operate correctly. Each computer and each application program in the computer, may require a different communication access method and protocol. Data must be presented to the end users in a form that can be recognized and manipulated. The end user terminal or computer must format the received data, regulate the data rate, control order of arrival etc. These tasks and others like them have nothing to do with the operation of the network. Software generally provides the added controls required at either end of the network.

LAYERED COMMUNICATION ARCHITECTURES

Layered communication architectures such as IBM's Systems Network Architecture (SNA) and the ISO Reference Model for Open Systems Interconnection (OSI) and etc. provide for sequences of required tasks.

The purpose of the layered architectures is to provide for reliable, timely communication between disparate end users. The architecture may be visualized in two groupings: (1) a higher-layer grouping of layers that involves the setting up and maintaining a connection (session in SNA terms) between end users, and the syntax and semantics of the data exchanged, and (2) a lower grouping of layers that provide the network transport capability end to end. By presenting the present invention in a SNA context, only background information about SNA will be discussed.

NETWORK ADDRESSABLE UNITS (NAU'S)

End user devices in a SNA network include terminal users, workstations, application programs, printers, graphics display devices, and memory storage devices. End user devices access a SNA network through access ports or connection resource managers called logical units or LU's.

LU'S

The LU's at either end establish the session of logical connections over which end-user data is transported. One LU can support several end users and can support sessions to multiple LU's.

Various types of LU's carry on particular types of sessions. Type 1 LU's support communication between an application program and data processing terminals; type 2 LU's support application programs communicating with a single display terminal in an interactive mode; type 3 LU's support application programs communicating with a single printer; type 4 LU's enable data-processing terminals connected as peripheral nodes to communicate and type 6 LU's correspond to program-to-program communication.

PU'S AND SSCP'S

To help in managing the network, SNA employs two other resource managers, a physical unit or PU, which manages the communication resources at a given node (these comprise the data links and communication channel serving the node), and a system services control point or SSCP, which manages all resources within a subset of a network called a domain.

All three units (LU's, PU's and SSCP's) comprise the group of network addressable units (NAU's). Each unit having a unique network address permits addressing from anywhere within or from outside the network.

PU's, together with an SSCP that oversees them, ensure availability and readiness of the communication links. The SSCP helps in setting up and taking down a session, provides control and maintenance support for its domain, maintains a directory and routing tables and communicates with the other SSCP's across the network.

Interconnecting nodes form the SNA network. Each node contains one PU, responsible for management of its links and channels. It may contain many LU's. SNA has four kinds of nodes, each designated as a different PU type. PU type 1, is made up of low-function terminals and controllers. PU type 2 consists of high function terminals, distributed processors, and cluster controllers (devices which control terminals, display systems and other lower-function devices). These two groups of nodes form peripheral nodes. These nodes do not participate directly in the operation of the transport network. They attach to another group of nodes called sub-area nodes.

The sub-area nodes include PU type 4 nodes which are communication controllers running on a Network Control Program (NCP) and PU type 5 nodes which are usually host computers. These type 4 and 5 PU's are interconnected to form the transport network. The SSCP resides in a PU type 5. One SSCP controls a domain made up of PU type 4, 2 and 1 nodes. A PU type 4 may reside in two domains. Although a node generally corresponds to a system or device, it is possible to have more than one node (multiple PU's) in a given physical device.

RELATIONAL DATA BASES

Relational data bases stored in a computer on direct-access storage (such as disks) permit the central processing unit (CPU) of a computer to exploit the relationships within a reasonable span of time. Multiple users can share the same accurate, consistent, up-to-date information efficiently from remote and local locations.

In the corporate world, data suffer from incompatibilities across different computer platforms, different peripheral devices, and manipulations of non-data base software packages in different and un-integrated formats. Some corporations which have transferred their manual operations into computerized systems to offer economical, high speed, accurate data processing have created various difficulties for users to obtain, integrate, or transform their databases.

The integration issue fostered generalized data base management systems (DBMS). The DBMS, in turn, required a formal way to express the data's logical structure and use. Hence, data models resulted for representing fundamental real-world ideas necessary for structuring the databases that an enterprise uses.

Data base designers have employed data structure diagrams (not flow diagrams) to present general pictures of record types (entities) and relationships of tables represented by boxes in the diagram. Usually, a relationship between any two record types is not symmetrical. An entity refers to any object (a person, place or thing) or an event (purchase date of the computer, date of employment}. Hence, the designers have developed various symbols to show zero-to-one, one-to-one, zero-to-many, one-to-many, many-to-many type relationships between entities.

The relational data model provides three features: structure, integrity, and manipulation. From a user viewpoint, the structure of the relational model represents a collection of tables called relations.

STRUCTURE

The rows of the tables called tuples or records represent instances or occurrences of the entity or relationship. The columns or fields of the tables show the attributes of the entity. A domain of the attribute equals the set of all possible values that can appear in a given column. Hence, a table associates with another table by attribute values in their respective columns that come from a common domain. If the attribute has unique and defined (non-null) values for each tuple, the attribute may serve as a primary key of one of the entities involved.

INTEGRITY

Referential integrity provides a set of rules for defining the relationship between two tables, a "parent" and a "dependent" table. The parent table defines the domain of the dependent table.

The first rule of referential integrity dictates how to define the parent table. Step (1) Include an attribute in the parent table that uniquely identifies each row in the table. Sequentially assigned numbers achieves uniqueness. The assigned number becomes a unique identifier. This attribute cannot be null. Step (2) Define this attribute as the "Primary Key" for the table. Step (3) Define a unique index for the table that uses the attribute. These three steps complete the definition of the parent table and its referential integrity components. A dependent table can now be defined.

The second rule dictates how to define the dependent table's relationship to the parent table. Step (1) Include in the definition of the dependent table an attribute which matches, in both size and format, the primary key of the parent table. Define this attribute as a "Foreign Key" from the dependent table to the parent table. To further illustrate the difference between a primary key and a foreign key, consider the following examples of Department and Employee Tables: DEPARTMENT (DEPT#, DNAME, MGR#); EMPLOYEE (EMP#, ENAME, DEPT#). The DEPT# column in the DEPARTMENT table uniquely identifies departments; i.e., it is a primary key. Employees are assigned to departments, as shown in the DEPT# column of the Employee table. The DEPT# values in the Employee table reference (refer to ) DEPT# values in the Department table. This makes EMPLOYEE.DEPT# a foreign key. This completes the definiton of the referential integrity between the parent and dependent tables.

Referential integrity regulates the deletion of rows from the parent table and the addition of rows to the dependent table. The foreign key in each row of the dependent table must exactly match the primary key of a row in the parent table.

The referential integrity rule states that the foreign key in the dependent table can either be null, i.e, the dependent row does not relate with any row in the parent table, or it must exactly match one of the unique primary key values of the parent table. To insert a row into the dependent table, its foreign key value (which points to the parent table) must be null or match a primary key in the parent table.

Enforcement of the integrity rules prevents orphan rows. This is done by (1) restricting the deletion of parent table rows that are pointed to by dependent table rows, or (2) by deleting all the dependent table rows which point to the deleted parent table row, or (3) by setting the pointer in the dependent table rows to null when deleting the parent table row and (4) by prohibiting the insertion of dependent table rows that point to parent table rows that do not exist.

STRUCTURED QUERY LANGUAGE

Data manipulations of the tables fall in two major classes, relational algebra and relational calculus. The relational algebra consists of the set operators-union, intersection, and difference, along with special operators such as select, project and join. Taking one operator with one or more operand permits producing a new relation as its result.

Relational calculus stems from predicate calculus. To query the database, one writes a mathematical logic statement which affirms or denies one or more mathematical results. The data manipulation language Structured Query Language (SQL) used for IBM's DB2 systems contains a blend of relational algebra and relational calculus.

With diverse networks, data bases and a variety of network management functions used by different organizations within the enterprise with little sharing of data between them, we searched for ways of establishing a common source for all network-related data, enterprisewide. That search ended in the network repository system of the present invention.

SUMMARY OF THE INVENTION

The present invention concerns a novel relational data base system for managing a data communications network by searching, addressing, retrieving and manipulating records of tables stored in a central repository containing network information.

The records contain functional and physical attributes of nodes and links. The functional records are stored in tables and are related in a relational data base format that models the architectural configuration of the network. The physical records are also stored in relational tables and are used to represent the physical entities comprising the network.

A novel relational data base table employs a novel relational key called a nonstandard reference (NSR) which is used to relate functional records with corresponding physical records. The NSR permits arbitrary association of network functional and physical entities stored in the central repository without disruptions to the searching, addressing, retrieval and manipulating capabilities of the management system. Also, NSRs are used to relate physical records to administrative and change information.

BRIEF DESCRIPTION OF THE DRAWING

Note: Reference numbers in the figures have three or more digits with the two least significant digits representing numbers within the figure and the more significant digits representing the figure number.

FIG. 5 depicts DBMS table operations using Primary Keys (PK), Foreign Keys (FK) and Non-Standard References (NSR) to perform functional to physical mapping using the Physical Implementation (Pimpl) table;

FIG. 6 depicts DBMS table operations using PK's, FK's and NSR's for determining which physical terminal implements several functional terminals;

FIG. 7 depicts DBMS table operations using PK's and FK's for determining the cost of a particular modem;

FIG. 8 depicts DBMS table operations using PK's and FK's for determining the model number of several terminals;

FIG. 9 illustrates DBMS table operations using PK's and FK's to determine the PU's that connect to a certain line;

FIG. 10 depicts DBMS table operations using PK's and FK's to determine channels on a certain T1 node;

FIG. 11 depicts DBMS table operations using PK's and FK's to determine the location of a certain host computer;

FIG. 12 illustrates DBMS tables using standard and nonstandard references to add a CCU to an existing line;

FIG. 13 illustrates a stored SQL query used to locate all the CCU'S connected to a certain line; and FIG. 14 illustrates the display viewed by a user who desired the information from the query of FIG. 13.

DETAILED DESCRIPTION OF A PREFERRED EMBODIMENT

Figure 1:
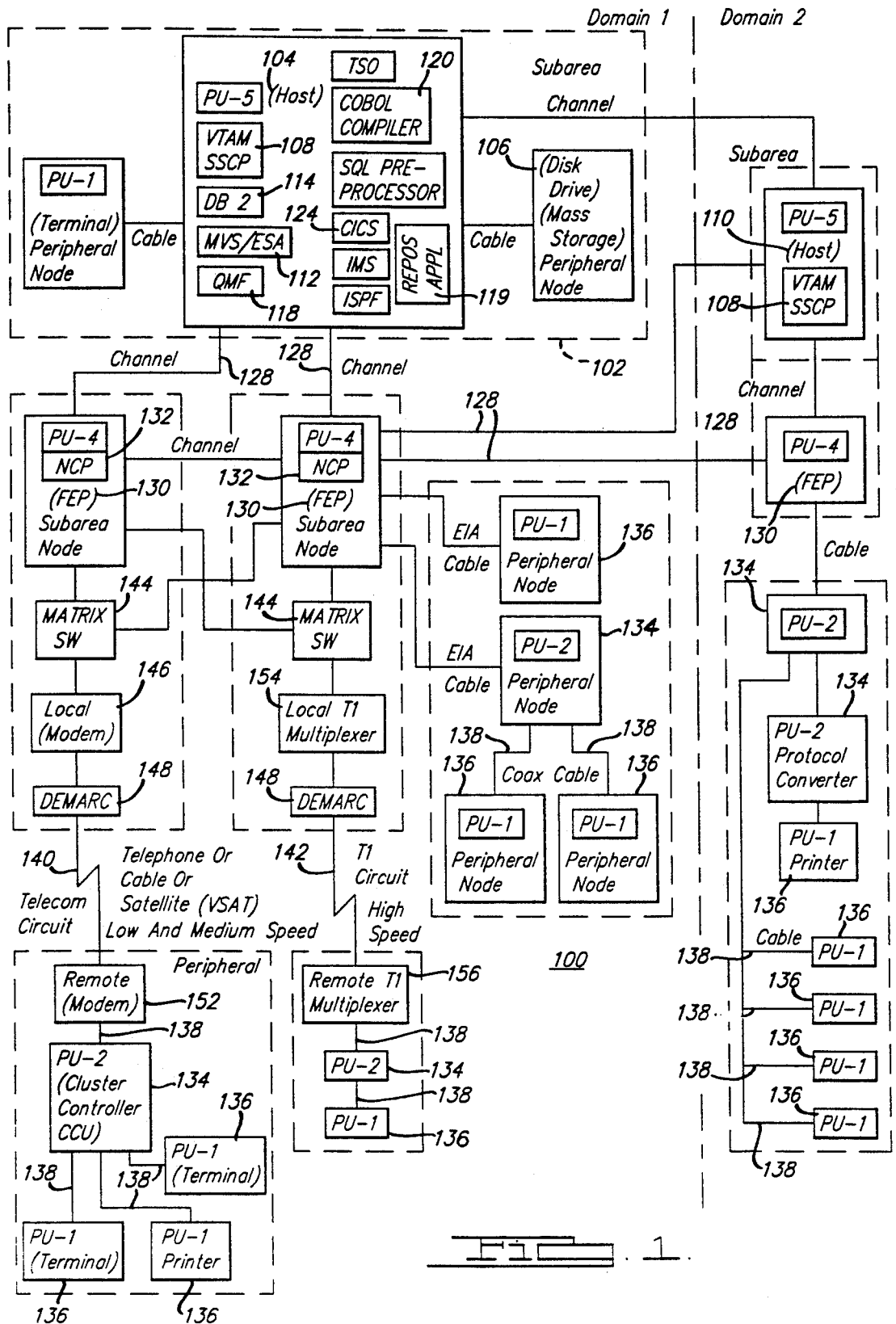
FIG. 1 depicts in block diagram form a network of an enterprise employing groupings of SNA and other types of network nodes with one of the groupings of nodes (Node I, Domain I) containing the repository of this invention.

With reference to FIG. 1, this figure depicts in block diagram form a SNA and other types of network element groupings of nodal switches and communication links of a distributed communication network 100 of an enterprise. This grouping of nodes in FIG. 1 spans just two domains for illustrative purposes; however, the principles of this invention apply to networks comprising many more domains.

Within the groupings of nodal switches and communications links, components of a relational database repository exist in sub-area 102. A host computer 104 and disk drives 106 for mass storage of data form the major physical components in which the repository resides.

The host 104 uses a group of IBM licensed system programs, to perform machine dependent system functions, to control the network and to operate the repository. Although the repository could be located in domain 2 or some other domain, in this illustration it resides in domain 1.

Within each domain, one host computer contains the SSCP NAU. The SSCP, normally one per domain, has complete knowledge of, and control over type 4, 2 and 1 nodes within the domain. In FIG. 1, the SSCP operates in host 104 in domain 1 and in host 110 in domain 2. These SSCP's reside in IBM's Virtual Telecommunications Access Method (VTAM)software 108 that controls the flow of data to various designated users.

Host 104 also contains a software operating system for large mainframes called Multiple Virtual Storage Enterprise Systems Architecture (MVS/ESA) 112. MVS/ESA controls the execution of programs.

Other system programs not considered a part of the operating system include utility routines, a loader and a translator. The utility routines perform frequently used functions needed by many application programs (programs written by or for the user) such as sorting data base relations or copying data or a program from a tape to disk, etc.

The loader loads programs into memory for execution. The translators; e.g., a compiler translates high level language programs (COBOL, FORTRAN) into machine language and assemblers translate mnemonics of assembly language programs into machine language.

For repository operations, host 104 employs other programs such as Database 2 (DB2) 114, an IBM relational data base management system (RDBMS), that uses SQL for relational data base management systems designed to support interactive queries, report writing, and end user computing; Query Management Facility interface (QMF) 118, an IBM program, that accesses tables, allows ad hoc SQL queries, prepares reports and executes procedures for a series of queries and reports, and prepares data for graphics in response to suitable input data; Common Business Oriented Language (COBOL) compiler 120 a program that translates COBOL programs into machine language; Customer Information Control System (CICS) 124 an IBM program that processes transactions submitted from a user terminal, accesses the proper data bases as dictated by the transactions and displays the results of the transactions on the user's terminal.

In addition to the type 5 nodes, FIG. 1 depicts subarea channel links (channel) 128 that connects type 4 and 5 nodes, the type 4 nodes being front-end processors (FEPS) 130 running Network Control Programs (NCP) 132. NCP's provide advanced communications functions to PU type 2 peripheral nodes 134 (CCU's, Remote Job Entry units) and PU type 1 peripheral nodes 136 (terminals, printers); and peripheral links (cables) 138, low and medium speed telecom circuits 140 and high speed circuits 142.

Although DB2 is used in this preferred embodiment, this invention can be implemented using other true relational data base systems.

FUNCTIONAL/PHYSICAL DATA STRUCTURE DIAGRAMS

The repository stores information about the SNA network and its nodal switches and communication links. However, it became important to allow the repository to store information about all network elements regardless of the network architecture used to manage them. That requirement meant completely separating descriptions of physical devices from descriptions of functional entities they represent. The distinction between functional entities and physical devices is critical because the repository must store data in as general a way as possible to allow for future growth. While SNA is shown, the invention which allows any-to-any connectivity is applicable to NON-SNA architecture, LANS and other OSI based networks as well. A network management system (NMS) can view and manipulate functional (or logical) entities, but such viewing and manipulating has no meaning outside of the context of that system since the network architecture defines the entities.

Figure 2:
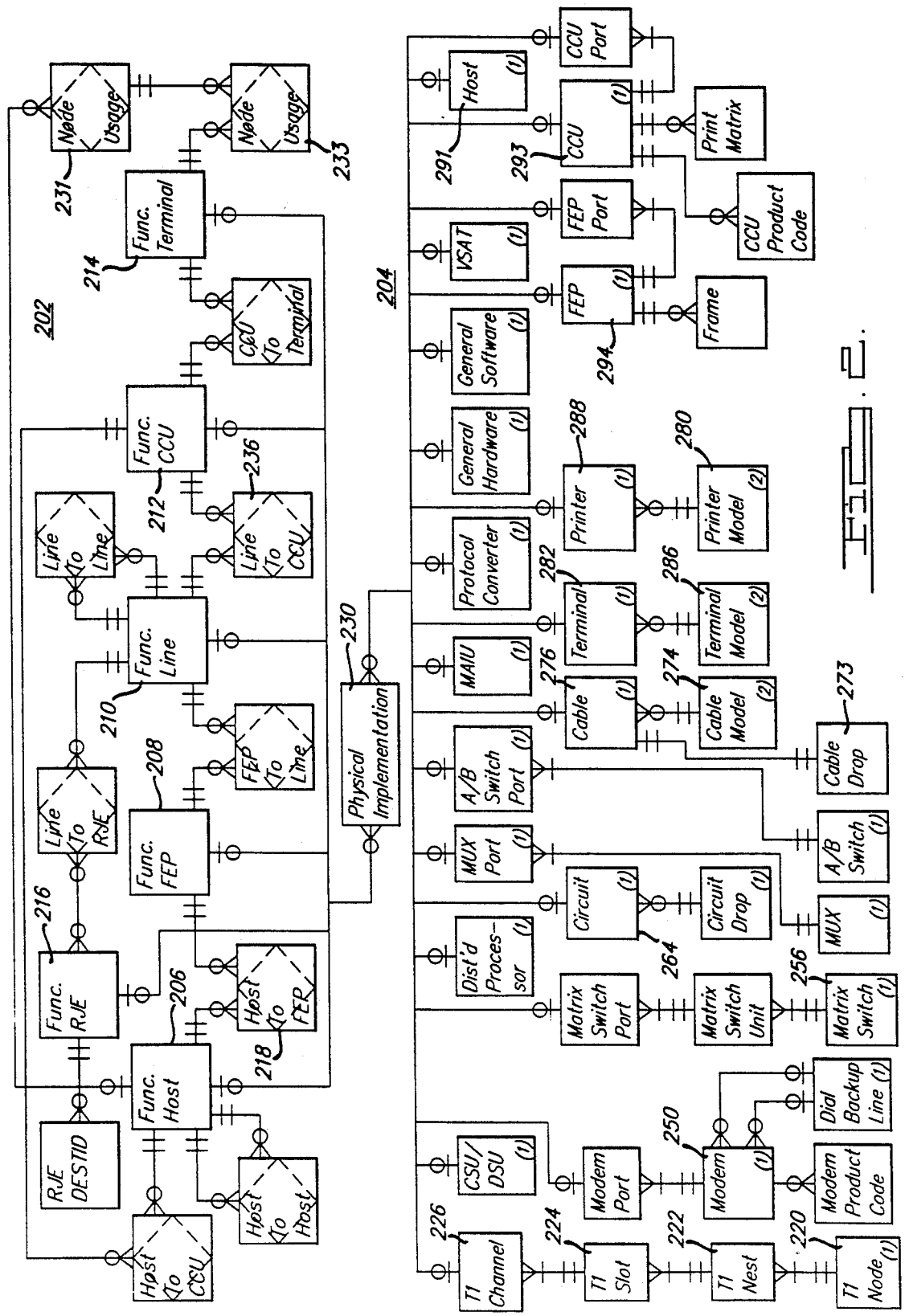
FIG. 2 illustrates a relational data base model of a communication network of the enterprise of FIG. 1 separated into logical (functional) and physical tables which is illustrative of a major portion of the repository of this invention.

FIG. 2 depicts a logical (functional)/physical diagram of tables containing an array of information of the various nodes and communication links of multiple networks similar to the one of FIG. 1. These tables, stored in a network repository of a centralized network management system (CNMS), contain data which enable system enterprise management of multiple networks.

Illustratively, this invention, in its present form, permits managing from a central location 15 data centers, 40 FEP's and about 35,000 devices from a variety of vendors. Services provided from this central location include inventory, configuration, change, accounting and security management.

GENERAL FUNCTIONAL TABLES (GF)

FIG. 2, upper portion 202, depicts relational tables that contain the functional name and related information of NAU's and links logically interconnected according to a network architecture using conventional database symbols to depict connectivity. The upper portion 202 depicts a relational-table diagram of the logical network.

Note that the relations in the upper portion 202 show that a host node record from the func host table 206 (containing a primary key) may optionally connect to one-to-many other host nodes by a related record (containing a foreign key) in an associative host-to-host table 216.

Also, the diagram shows that a host node record from the func host table 206 optionally connects to one-to-many FEP's by related records in an associative Host-To-FEP table 218. The diagram depicts similar relations for the other NAU's; i.e. func FEP 208, func line 210, func CCU 212, func terminal 214 and func RJE 216 tables. RJE's are not NAU's, but shown in the upper portion 202 because RJE's perform important network functions.

GENERAL PHYSICAL TABLES (GP)

The lower portion 204 depicts relational tables representing actual physical hardware and subsidiary equipment that implement the NAU's and links listed in the upper portion 202. These tables not interconnected in a network architecture scheme, connect in a top-down structural manner, using conventional symbols and reference numbers in some of the tables, to show relationship with other relational tables defined infra.

Note, from a hierarchical point of view, that the relations in the lower portion 204 show a T1 node record from a physical T1 node table 220 has a one-to-many connection to a T1 nest table 222 and several records in the T1 nest table 222 point to the T1 node record of table 220; each T1 nest record has a one-to-many connection to a T1 slot table 224 and many records in the T1 slot table 224 refer back to a T1 nest record; and each T1 slot record requires a one-to-many connection to a T1 channel table 226 and records in the physical T1 channel table 226 refer back to a record in the T1 slot table 224.

MISCELLANEOUS TABLES (MI)

Figure 3:
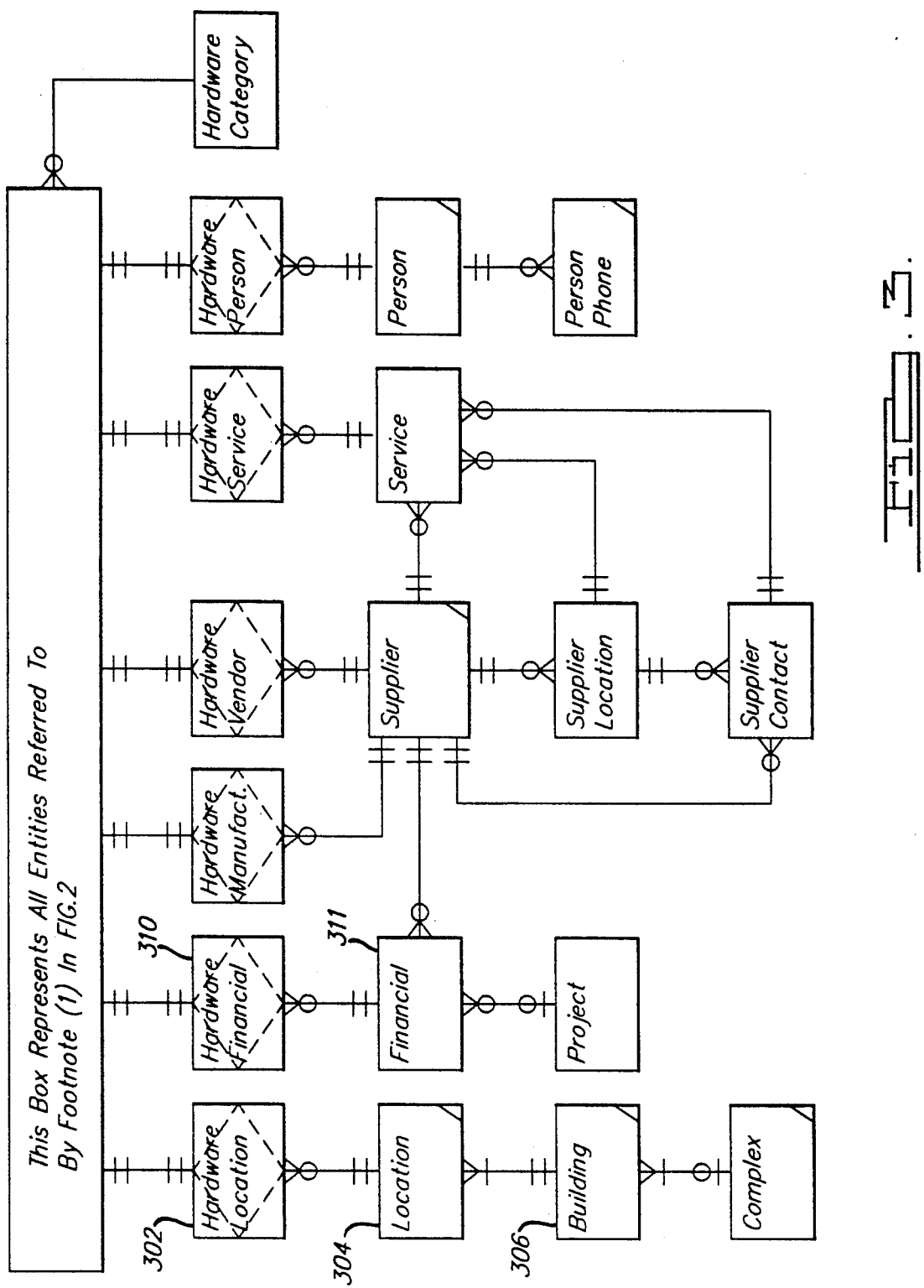
FIG. 3 illustrates relational data base tables of miscellaneous tables which augment certain designated physical tables of FIG. 2.

The one (1) in the T1 Node table 220 expands information about T1 nodes to include administrative information in the tables shown in FIG. 3. Additional information about location, financial, manufacturer, vendor, service, person in charge of and hardware category of the T1 Node exist in these tables.

The same administrative information applies for each piece of hardware in the lower tables of FIG. 2 with a one (1) shown in the box; i.e., such information exists in the data base for matrix switch 256, printer 288, FEP 294, CCU 293, Host 291 and all other hardware with tables that include the (1) notation.

IMPLEMENTATION PLAN TABLES (IP)

Figure 4:
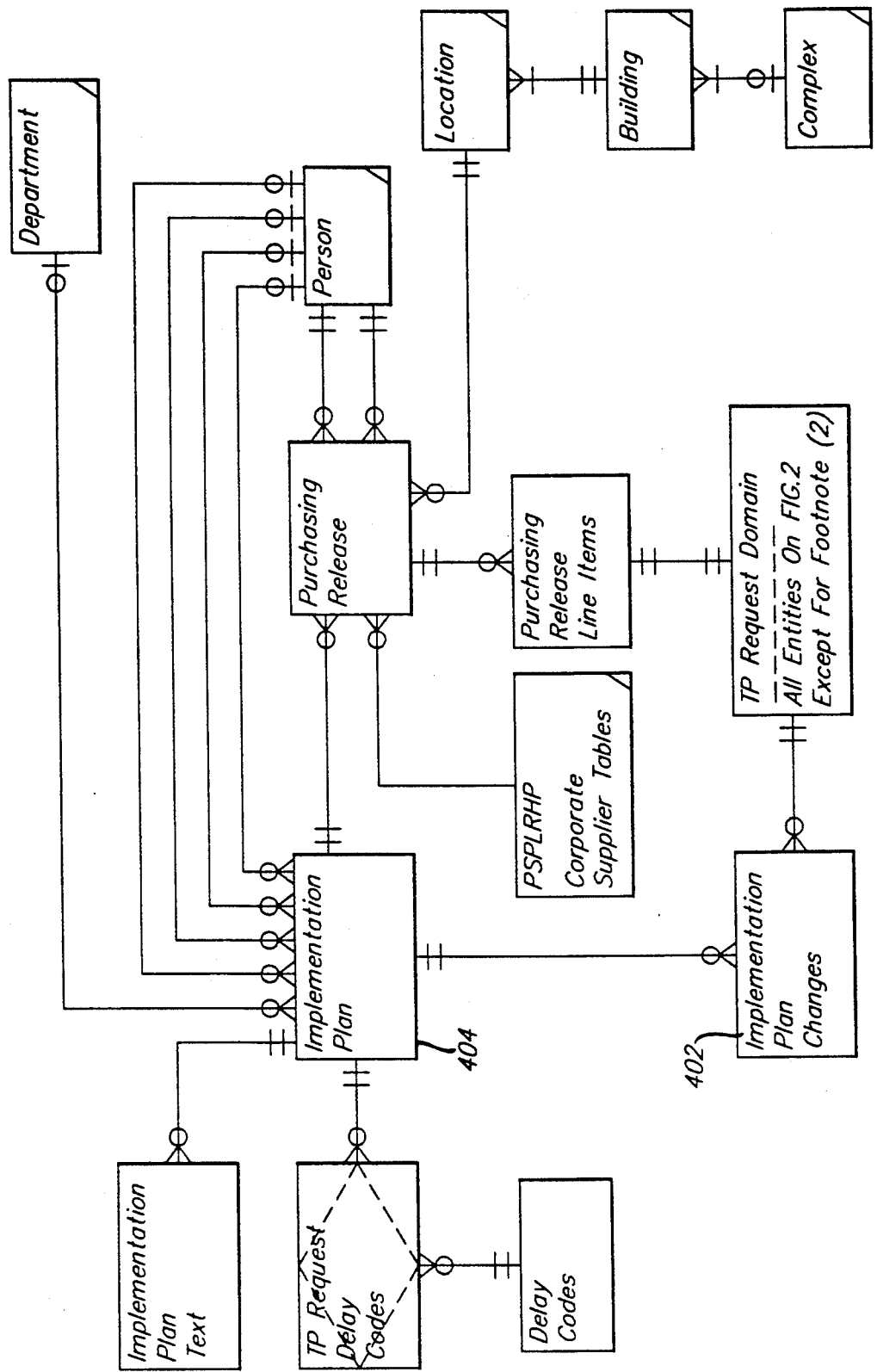
FIG. 4 depicts relational data base tables containing data for use in making changes in the state of the network configuration.

The tables of FIG. 4 show how the hardware and administrative portions of the data base fit in with a request handling portion. The tables of FIG. 4 provide the link between implementation plan and changes in the state of the network hardware. The two (2) in the Terminal Model Table 286 of FIG. 2 expands information about terminals to include administrative and change information in the tables shown in FIG. 4. The same administrative and change information applies for each piece of hardware in the lower tables of FIG. 2 with a two (2) shown in the box; i.e. such information exists in the data base for Cable Model 274, Terminal Model 286 and Printer Model 280. These tables permit adding or deleting hardware to maintain the current state of the network configuration. For each request, there are zero-to-many implementation change records, each of which has a non-standard-reference which points to a record affected by that request. The nonstandard-references and the employment of the implementation tables will be explained infra.

FUNCTIONAL TO PHYSICAL MAPPING

The repository permits functional to physical device mapping. Mapping refers to relating functional devices as seen by the network management system to the pieces of hardware that implement them. This is important since a user should have means for identifying faulty hardware when a network problem occurs. Mapping permits a user to determine whether a physical terminal has a history of trouble reports even though the terminal has been known by more than one functional name.

Also, mapping permits determining whether a functional entity exists as one or more physical entities, or a given functional entity exists physically in more than one form, or whether a single physical device implements one or more functional entities.

For another case where mapping becomes important, consider a network sending data between a FEP and a CCU; i.e., from a subarea node to a peripheral node. Under SNA, a line represents a logical entity because VTAM views lines separately from the physical hardware forming the actual path between the two devices; and VTAM does not maintain any information about the hardware. The line has its own SNA identification and SNA characteristics, such as initial status. These features known only by VTAM do not characterize line hardware. Furthermore, the line may be implemented in many ways; e.g., two modems connected to a leased circuit, a T1 connection, or a satellite connection. Each implementation involves several pieces of physical hardware, and VTAM doesn't know (or need to know) about them. Hence, a SNA line (and more generally, any functional entity defined by an architecture) is independent of the physical hardware implementing it. In addition, there is no guarantee that a particular type of hardware will always implement a particular type of logical entity. Therefore, the repository should not store a physical element description with any logical entity.

CONNECTIVITY

The repository deals with functional (logical) and physical connections. Functional connections relate functional entities to one another; e.g., in FIG. 2 a user node (stored in the repository table Func Terminal table 214) connects to a host application (stored in the repository usage table 231) via node usage table 230.

Physical connections relate physical entities to each other; e.g., the cable (stored in repository cable table 276) runs between a physical terminal (stored in repository table 282) and a cluster controller table 293 (stored in the repository table 273).

It is impossible to anticipate future hardware configurations. Therefore, the repository must maintain connection data in as general a manner as possible. Therefore, no assumptions exist about what type of device connects to another device. This generality will allow the repository to maintain information also about non-SNA architectures and devices when incorporated.

NON-STANDARD REFERENCES

Most of the repository tables follow standard relational theory. However, given the arbitrariness inherent in physical connectivity and physical-to-logical mapping, a number of relationships have foreign keys in a dependent table referencing records in an arbitrary parent table. Since IBM's DB2 does not support such arbitrary references, we departed from standard relational theory. This departure brought about references, used in this invention, called non-standard references (NSR's). NSR's consist of a pair of attributes: a parent table name and a foreign key that refers to a row of that parent table.

OBTAINING UNIQUE KEYS

Every row in the database has a unique key. When adding a new row to a table, the row receives an assigned, system-generated, unique number. An application program 119 of FIG. 1 generates it.

STATUS FLAGS

One of the primary functions of the repository is to store information about requests for establishing connections to the SNA network. Users submit requests, and the information concerning the request becomes the basis for specifying changes to the state of the network. Until processing is complete (including installing or removing circuits and equipment and updating the appropriate network control program), remains "pending". Hence, in column 3, for each record in the tables that represents any part of the configuration of the network affected, a status flag shows an "active", "pending", or "pending delete" state. The implementation plan tables of FIG. 4, mentioned supra, permit handling network change requests.

THE PHYSICAL IMPLEMENTATION TABLE (PIMPL)

With reference again to FIG. 2, as mentioned supra, each box in the figure represents a relational table. The tables in the top half store information about logical (functional) entities and those in the bottom half contain data about physical entities. Because of the many ways to implement functional and physical entities, this inventive system provides a way to do both the in the following manner: (a) if given a functional entity, find the physical entity or entities that implement it; and (b) if given a physical entity, find the related functional entity or entities that it implements.

Placing functional identifiers or foreign keys in physical entity tables or vice versa to accomplish the above, would require many columns, use excessive space and would create an inflexible solution. To remedy this problem, the physical implementation table or "Pimpl" resulted. The repository of this invention makes all references between the functional and physical entities via Pimpl.

With reference to FIG. 2, note the cardinalities represented by the relational symbols pointing to Pimpl. Each physical device is part of zero-to-many functional structures and zero-to-many physical devices implement each functional structure. Note that the "crow's foot" points to the table, Pimpl, containing a foreign key. Pimpl must include at least one foreign key from a functional table and one from a physical table.

PIMPL TABLE ATTRIBUTES

The Pimpl table, with prestored data, contains normally seven columns See FIG. 5 (Table 504). Column 1 provides a connection identifier (an internal code) that uniquely identifies a logical/physical association or physical connection. Column 2 presents sequence numbers. These numbers represent the connection sequence of the hardware that implements the functional entity. Column 3 contains a status flag.

The pair, columns 4 and 5, the functional entity table name column and a number referencing a row within the named table, form the NSR for the functional entity. The functional entity table name and the associated foreign key may appear in more than one row of Pimpl if more than one piece of hardware implements that functional entity.

The pair, columns 6 and 7, the physical hardware table name(s) column and a number referencing a row within the named table, form the NSR for the physical hardware.

The NSR of each piece of hardware needed to implement the functional entity appears on a separate row of Pimpl.

APPLICATION OF PIMPL (Functional to Physical Mapping)

For an illustrative application of Pimpl, refer now to FIG. 5. The top half of FIG. 5 depicts GFLINE table 502, an excerpt from functional line table 210 of FIG. 2. Table 502, a parent table, contains 2 records of functional lines. The first record has a line-network name of CL12054 and a unique primary key (PK512) of 1. The second record has a line-network-name of CL12053 and a primary key (PK514) of 2.

To find the physical hardware implementing CL12054, the DBMS looks in Pimpl, Table 504, for the functional line table (GFLINE) and for the foreign key (FK512). The combination of these data elements forms a NSR which refer to the parent table.

The DBMS can now find the physical hardware tables, (three tables-in this case), and the primary keys (three keys) for these tables. They combine to form the NSR's to a record in a parent table of physical entities.

To establish a unique key for each record in Pimpl, a connection identifier (I_IMPL_PHYS) 522 must combine with a sequence number (I_SEQ) 524 as depicted in table 504 by the (1,1) for the first row; (1,2) for the second row, (1,3) for the third row and (2,1) for the fourth row, respectively. Note that for I_IMPL_PHYS="1", the sequence extends from 1 to 3; hence, the physical implementation of CL12054 consists of three physical pieces of hardware.

The NSR (the hardware table name and the identifying hardware key), "GPMODM" and "1" point to a record in Table 506 where the data element "1", for foreign key FK 516 references "modem 1"; the second NSR, "GPCIRC" and "1" points to a record in circuit table 508 where FK517 references the "circuit 1"; and the third NSR, "GPMODM" and "2" points to a row in modem table 506 where FK518 references "modem 2".

ANOTHER APPLICATION OF PIMPL (THREE FUNCTIONAL ENTITIES REPRESENTED BY ONE PHYSICAL TERMINAL)

FIG. 6 depicts the tables and data elements required to determine the single physical terminal that performs the function of the three functional terminals that VTAM directs.

GTERM Table 602 presents excerpts of the func terminal table 214. This table provides unique keys (PK 612, 614, 616 and 618) for four functional terminals named under the field entitled "N_TERM-NL_NTWK".

To find the physical hardware that implements the functional terminals TM18080, TM18082, TM18084 and TM18086, the DBMS looks in Pimpl for the functional (logical) NSR comprised of functional terminal table names (GFTERM) and the foreign keys (FK612, FK614, FK616 and FK618).

DBMS discovers from the hardware NSR's of Pimpl that one NSR, "GPTERM" and "3", points to a record in Table 606 where the data element "3" of FK620 shows that the single physical hardware terminal number 4281 performs the function of three functional (logical) terminals.

AN APPLICATION OF NSR WITHOUT THE USE OF PIMPL

If a user desires to know how much it costs for modem serial number 123, an operator may request this information from the DBMS. With reference to FIG. 7, the DBMS looks at hardware modem table 250 and finds primary key PK712 (the data element =2) of "modem no. 123" depicted in table 702, table 702 providing excerpts from table 250. Then DBMS will refer to the table name "GPMODM" and the foreign key FK712=2 that form the hardware NSR in table 704, the hardware financial table (Excerpts of Table 310 shown in Table 704). The NSR points to a primary key PK714=2 in the financial table 311 (excerpts shown in Table 706) where the foreign key PK714=2 shows that the cost equals $100.

AN APPLICATION WHERE DBMS INTERACTS WITH TWO DIFFERENT SETS OF TABLES WITHOUT THE USE OF NSR'S

If a user desires to know which terminals have the model number 3279, the operator will request DBMS to look at the hardware terminal model table 286 (excerpts found in Table 804) for model 3279. There, the model number becomes the primary key (PK808).

Then DBMS refers to the terminal table 282 (excerpts found in Table 802) for FK808. FK808 refers to terminals 3, 4 and 5 which bear the model number 3279.

AN APPLICATION EMPLOYING ONLY FUNCTIONAL TABLES

To find which PU2's connect to line FL14109, DBMS refers to the functional Line Table 210 (excerpts in Table 902) for PK908=1 to line no. FL14109.

Then DBMS refers to FK908=1 in the Line-To-CCU Table 236 (excerpts in Table 904). In the I_CCU_FUNCL field of Table 236, DBMS finds that FK908=1 refers to five CCU's (FK910=1, FK912=2, FK914=3, FK915=4, and FK916=5). These foreign keys refer to PK910=1, PK912=2, PK914=3, PK915=4 and PK916=5 in the Functional CCU Table 212 (excerpt in Table 906) which indicate that PU2's FC141095, FD141091, FD141092, FD141093 and FD141094 connect to line no. FL14109.

AN APPLICATION EMPLOYING ONLY PHYSICAL TABLES

To find which T1 channels are on T1 nodes, the DBMS looks at the record in the T1 node table GPT1ND (Table 1002) of FIG. 10 where I_T-1_NODE is 5 and determines that it has PK1014=2. It then finds the record in table GPT1NE (1004) having a FK1014=2 (pointing to table GPT1ND 1002). It then finds the record in the GPT1SC table (1006) having a FK1012=2 (pointing to table GPT1NE 1004}. It then finds the records in the GPT1CH table having a FK1010=3 (pointing to table GPT1SL (1006), indicating channels 1 and 2 are on T1 node 5.

AN APPLICATION FOR FINDING THE LOCATION OF HARDWARE

To find the location of host computer serial number 6, DBMS refers to the Host Table 291 (excerpts in Table 1102) of FIG. 11 and find PK1102=3.

DBMS refers to FK1102=3 in the Hardware Location Table 302 (excerpts in Table 1104) and finds FK1106=2.

Then DBMS refers to PK1106=2 in Location Table 304 (excerpts in Table 1106) and find FK1108=1.

Then DBMS refers to PK1108 in Building Table 306 (excerpts in Table 1108) and finds host computer serial number 6 on the second floor of the Keller Building.

OPERATION OF THE SYSTEM

To obtain information from the repository of system 100 of FIG. 1, the user enters a SQL query at a user terminal such as terminal 136 of FIG. 1. Operation of the system can also be through individual SQL queries or through COBOL application programs at a user terminal such as terminal 136 of FIG. 1.

Illustratively, in an effort to troubleshoot the network, the user, needing to find which PU 2's connect to line CL12054, retrieves a prestored query such as the one shown in FIG. 13. (Individual queries could also be used).

Using this query, DBMS will SELECT columns FROM three tables; namely, [parent table] Func Line Table 210 [associative table] Line-to-CCU Table 236 and [parent table] Func CCU Table 212. Excerpts from Func Line Table 210, Line to CCU table 236 and Func CCU Table 212 are depicted in tables 902, 904 and 906 respectively.

DBMS uses the WHERE clause, to search for parent table GFLINE, column N_LINE_NTWK where the data element ='FL14109'. Then DBMS uses one predicate AND clause which refers to column I_LINE_FUNCL to yield a PK908=1 and to the associative table Line-to-CCU table 236 column I_LINE_FUNCL to yield a foreign key 908 =1. From this search, DBMS establishes a transparent join "A" table as depicted in Table 908.

Then DBMS uses the other predicate AND clause which refers to column I_CCU_FUNCL of associative table, Line-to-CCU table 236, to find the foreign keys 910=1, 912=2, 914=3, 915=4 and 916=5. These foreign keys points to the parent table Func CCU TABLE 212 and column I_CCU_FUNCL. DBMS establishes another transparent join "B" table as depicted in table 910 which yields from the N_CCU_NTWK column the serial numbers of five CCU's.

FIG. 14 depicts the output display that the user views at the display terminal.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A relational data base (RDB) system for managing a data communications network by searching, addressing, retrieving and manipulating records of tables containing information concerning the network stored in a central repository, said data communication network comprising network nodes and links defined by functional and physical entities and attributes, said system comprising:
    (a) means for arranging names of functional entities along with functional attributes of the functional entities in a first set of relational database (RDB) tables, said set of RDB tables related in a manner that models the architectural configuration of said network and wherein said first set of RDB tables include a plurality of parent tables and a plurality of associative tables which are dependent tables with respect to said parent tables, wherein said parent tables contain a primary key for each record listed therein and wherein said associative tables contain at least a pair of conventional foreign keys for each record listed therein, said pair of foreign keys pointing to two parent tables of said first set of RDB tables;
    (b) means for arranging names of physical entities along with physical attributes of said physical entities in a second set of RDB tables;
    (c) means for forming a physical implementation RDB table which relates said first set of RDB tables to said second set of RDB tables, said physical implementation RDB table employing a chosen form of reference that associates specific functional entity names and attributes recorded in said first set of RDB tables with specific physical entity names and attributes recorded in said second set of RDB tables;
    (d) storage means for containing said functional, physical and physical implementation RDB tables in a manner forming a tabular repository of named entities and attributes of said network; and
    (e) computer means programmed to permit using information in said functional, physical and physical implementation RDB tables stored in said repository to determine interconnections and attributes of the network nodes and links and to determine how to arrange the network nodes and links to reestablish lost functions and/or to configure the network nodes and links to a different form.

2. System in accordance with claim 1 also including (1) means for arranging names along with attributes of administrative characteristics associated with a first group of the physical entities and attributes named in said second set of RDB tables and (2) means for arranging names along with attributes of other administrative characteristics associated with attributes of administrative characteristics of a second group of the physical entities and attributes named in said second set of RDB tables wherein said second set of RDB tables include extended tables containing administrative and change information, wherein said administrative information provides such information as hardware location, financial data, manufacturer name, vendor name, service contract data, person in charge of, and hardware category of the network nodes and links, and wherein the change information provides information that permits adding or deleting hardware forming the nodes and links in a manner that changes the state of the network.

3. System in accordance with claim 2 wherein said second set of RDB tables include a plurality of parent tables having a primary key for each record listed therein, wherein said extended tables include a plurality of parent tables having a primary key for each record listed therein and a plurality of dependent tables having a nonstandard reference (NSR) and a conventional foreign key for each record listed therein, said NSR consisting of a pair of attributes, namely a parent table name and a foreign key, said foreign key referring to a row of that parent table that is in the second set of tables and wherein said conventional foreign key refers to a row of a parent table in said extended tables.

4. System in accordance with claim 3 wherein said physical implementation RDB table (PIMPL) contains records wherein each record consists of a pair of NSRs, wherein a first NSR of said pair of NSRs consists of a name of a parent table of said first set of RDB tables and a foreign key that refers to a row of that parent table, wherein the second NSR of said pair of NSRs consists of a name of a parent table of said second set of RDB tables and a foreign key that refers to a row of that parent table and wherein said pair of NSRs permitting said computer means to determine which one of many physical entities and attributes are needed to implement a selected functional entity and attribute or vice versa.

5. System in accordance with claim 4 wherein said computer means contain programs which permit an operator to access aid repository using a chosen query language to: (a) find the physical entity or entities that implement a functional entity and vice versa; (b) find administrative attributes of a physical entity; (c) find the functional entity associated with another functional entity; (d) find a physical entity associated with other physical entities; (e) find all the logical entity that a physical entity implements; (f) find all the devices at a specified location; (g) find the devices for a specific manufacturer or vendor; (h) find all devices under a specific service agreement; and (i) find all the devices for which a specific contact person is responsible.

6. A method of forming a relational data base (RDB) system for managing a data communication network by searching, addressing, retrieving and manipulating records of tables containing information concerning the network stored in a central repository, data communication network comprising network nodes and links defined by functional and physical entities and attributes, said method comprising the steps of:

(a) gathering tabular records of the physical and functional entities and attributes of the nodes and links forming the network as well as administrative data associated with each physical entity in the network;

(b) preparing a relational database model of the network wherein said model separates the functional entity and attribute records from the physical entity and attribute records of the network, wherein said functional records are related in a manner to depict the architectural structure of the network and wherein said model includes a physical implementation (PIMPL) RDB table which combination of functional and physical entity records links specific records of a functional entity that is implemented by a specific physical entity or combinations of physical entities or vice versa;

(c) storing in a data memory said functional records as parent and associative RDB tables wherein said parent tables contain primary keys and said associative tables contain foreign keys referring to at least two of said parent tables containing said primary keys in a manner that relate the architectural arrangement of the network to the arrangement of the functional records;

(d) storing in the same data memory groups of related records of said physical records as parent tables, wherein said groups are stored in arbitrary tables;

(e) storing in the same data memory the PIMPL records in a table that is dependent on functional records and physical records, wherein said PIMPL records refer to a physical record or a group of physical records that provide information regarding the implementation of a functional entity or entities described in said functional records;

(f) preparing an RDB model of administrative records that form an addendum to selected tables of said physical records stored as primary tables, said addendum providing physical entity location, financial data, manufacturer name, vendor name, service contract data, person responsible and category information, said addendum also providing means for implementing changes to said primary functional and physical tables and said associated functional tables as well as said dependent implementation tables;

(g) after providing a computer means, storing application program means in said computer means that permit using information in said functional, physical, administrative and physical implementation RDB tables in said memory to determine the location and attributes of the network nodes and links as well as to determine how to arrange the network nodes and links to reestablish lost functions and/or to configure the network nodes and links to a different form.

7. The method of claim 6 wherein said application program means include means for using Structured Query Language (SQL) for communicating with said RDB and means for providing screen display on a terminal of resulting tables.

* * * * *